June 15, 1954     R. A. GAISER     2,681,405
ELECTRICALLY CONDUCTING FILMS

Filed Feb. 2, 1951     2 Sheets-Sheet 1

Inventor
Romey A. Gaiser
By Nobbe & Swope
Attorneys

June 15, 1954  R. A. GAISER  2,681,405
ELECTRICALLY CONDUCTING FILMS
Filed Feb. 2, 1951  2 Sheets-Sheet 2

Inventor
Romey A. Gaiser
By Nobbe & Swope
Attorneys

Patented June 15, 1954

2,681,405

UNITED STATES PATENT OFFICE 2,681,405

ELECTRICALLY CONDUCTING FILMS

Romey A. Gaiser, Toledo, Ohio, assignor to Libbey-Owens-Ford Glass Company, Toledo, Ohio, a corporation of Ohio Application February 2, 1951, Serial No. 209,142

7 Claims. (Cl. 219—19)

The present invention relates broadly to electrically conducting films, and more particularly to an article having a ceramic base and a continuous, electrically conducting film extending from an electrode on one surface of said base to an electrode on an opposite surface and over an edge of said base that is contiguous to said surfaces.

Although the invention is in no way restricted to electrically conducting films of any particular type or composition, or to their use with any particular kind of base or supporting surface, it has to date proven most valuable in connection with transparent, electrically conducting films of tin oxide on glass sheets, and it will be specifically described in that connection here.

Glass sheets coated with transparent, electrically conducting films of tin oxide, that are applied by exposing the glass sheet while at a temperature approximating the softening point of the glass to the action of a tin compound in fluid form, have come to be quite widely used in de-icing windows or windshields in aircraft and other automotive vehicles.

In use, the electrically conducting film on the glass sheet is supplied with sufficient electrical energy, through suitable electrodes secured to the glass and in electrical contact with the film, to heat the glazing unit to a temperature at which ice or frost will be removed from, or its formation prevented on, the surface of the exposed face of the unit.

Heretofore it was thought that an electrically conducting film could only be successfully used for this purpose when it was applied to a glass sheet that was substantially rectangular in shape. This was because with de-icing units of the above character, electrodes are provided which extend along the length of the marginal portions that are adjacent two opposite edges of the filmed glass sheet and, with the preferred uniform thickness of film, it is necessary that the electrodes be equidistant from one another throughout their length in order to produce a uniform temperature over the area of the film upon application of the required amount of electrical energy to the electrodes.

In situations where the electrodes are not spaced equidistantly from one another throughout their length, objectionable non-uniform heating of the glass results because the electrical energy seeks the shortest path from electrode to electrode through the film and thus creates overheated areas where the electrodes are closest together and relatively cool areas where the electrodes are farthest apart. Consequently, de-icing units in which the electrodes are arranged along opposite margins of the filmed glass surface have proved unsatisfactory for the purpose when the glass surface was non-rectangular in shape.

This presents a rather serious handicap to the extended use of these electrically heated de-icing units because present day aircraft and automotive styling present relatively few opportunities to employ straight, rectangular windows; and this is particularly true in the glazing of aircraft noses, or the front ends of automobiles, where the icing problems are greatest.

For example, the aircraft companies are currently interested in triangularly shaped lights for windshields. For this purpose two lights of glass, in the shape of right angled triangles having equal sides, are arranged in V formation, with the hypotenuse edge of each triangular light in abutting relation to the other.

Now triangularly shaped lights of glass presented the most difficult problem of all of the non-rectangular shapes encountered from the standpoint of providing them with a uniformly heated electrically conducting film because, regardless of what two margins of a triangular surface are provided with electrodes, these electrodes will meet at the juncture of the two margins and will diverge quickly and sharply in proportion to their distance from the juncture.

For this reason, it was found to be impossible to produce a satisfactory triangularly shaped de-icing unit by the conventional procedures.

However, applicant has now discovered that by means of this invention, he can produce a uniformly filmed, electrically conducting glass sheet of the above shape, provided with electrodes along two margins, that will give a uniformity of heating when current is applied to the electrodes that is comparable to the uniformity obtained with regular, rectangularly shaped, filmed lights.

Briefly stated, this is accomplished by applying an electrode along a margin on one face of the triangularly shaped light of glass that is adjacent one leg of the triangle, then applying another electrode along the margin of the opposite face of the light that is adjacent the other leg of the triangle, and finally applying a continuous electrically conducting film to the light, which continuous film extends from the electrode on the first mentioned face to the electrode on the opposite face and over the hypotenuse edge of the light. With this arrangement, the two electrodes will be equidistant from each other throughout their lengths when measured along the continuous film and so will give uniform heating over the entire filmed area when current is applied to the electrodes.

It is therefore a primary aim of this invention to provide an electrically conducting glass sheet that carries a pair of electrodes, one arranged along a margin of the sheet on one surface thereof and the other arranged along a margin of the glass sheet on the opposite surface, and a continuous electrically conducting film on the glass sheet which extends from the electrode on one surface of the glass sheet to the electrode on the opposite surface and over an edge of said sheet.

Another object is the provision of a non-rectangular sheet of glass carrying a pair of spaced electrodes and having a continuous electrically conducting film of uniform thickness extending between said electrodes which will heat uniformly throughout its area upon application of electrical current to said electrodes.

Another object is to provide a triangularly shaped sheet of glass of the above general character, which can be heated uniformly throughout its surface area.

Still another object is the provision of a resistance heating unit made up of a sheet of glass provided with a continuous electrically conducting film of tin oxide over both surfaces and one edge thereof.

Further objects and advantages of the invention will become more apparent during the course of the following description, when taken in connection with the accompanying drawings.

In the drawings, wherein like numerals are employed to designate like parts throughout the same:

Figure 1:
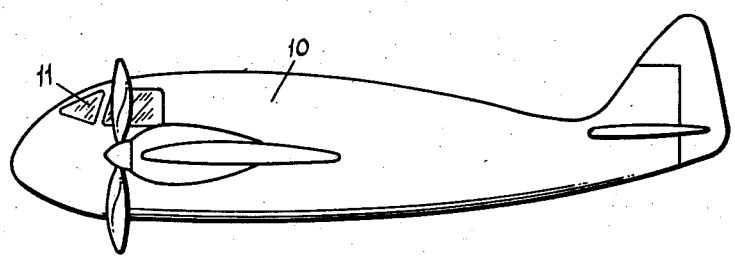
Fig. 1 is a side elevation of an airplane, showing a glazing unit made in accordance with this invention in one of the forward lights or windshields.

Referring now more particularly to the drawings, there is shown in Fig. 1 a conventional type of aircraft 10 having a triangularly shaped window or windshield section 11 in its nose. As pointed out above, triangularly shaped glass sheets have heretofore presented a seemingly insurmountable problem so far as de-icing with an electrically conducting film is concerned. Surprisingly enough, however, such triangularly shaped lights, and particularly those of the shape shown here, are especially well adapted for filming according to the present invention in a manner to provide uniform heating over the entire area of the light.

Figure 2:
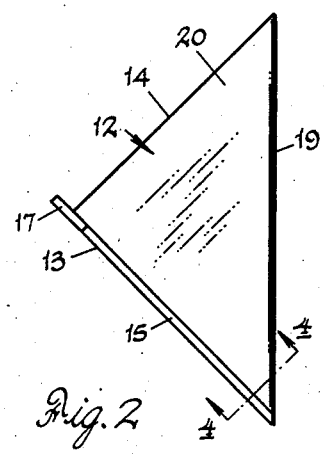
Fig. 2 is a side view of a triangularly shaped light of glass provided with an electrode along one side margin thereof.
Figure 3:
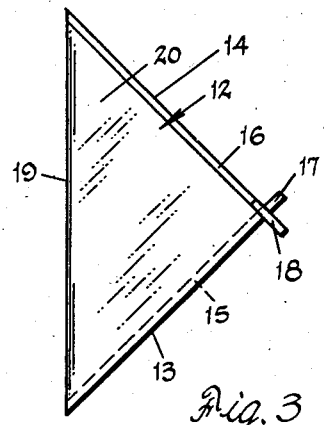
Fig. 3 is a view of the opposite side of the glass sheet of Fig. 2, showing an additional electrode applied along a side margin of this side, and an electrically conducting film on both surfaces of the glass and extending over the hypotenuse edge.

Thus, as best shown in Figs. 2 and 3, a glass sheet 12 to be incorporated into the glazing unit 11 will be in the shape of a right angled triangle having equal sides 13 and 14. In making such a sheet electrically conducting according to the invention, an elongated electrode is first applied along one side margin, as shown at 15 in Fig. 2. The sheet 12 is then turned over, as shown in Fig. 3, and a second elongated electrode is applied along the other side margin of the opposite face of the sheet as shown at 16.

The next step is to apply an electrically conducting film, and preferably a transparent, electrically conducting film of tin oxide, to both sides of the sheet 12, and to the hypothenuse edge 19, to form a continuous film 20 covering both surfaces of the sheet and extending from the electrode 15 on one side to the electrode 16 on the other and over the hypothenuse edge 19 (Fig. 4); after which suitable terminal connections 17 and 18 can be soldered to the electrodes.

This procedure produces, on the two sides and an edge of the glass base, a continuous film which functions in the identical manner that a rectangular or, more specifically, a square filmed area on a single surface and having electrodes along opposite margins thereof will function.

Figure 5:
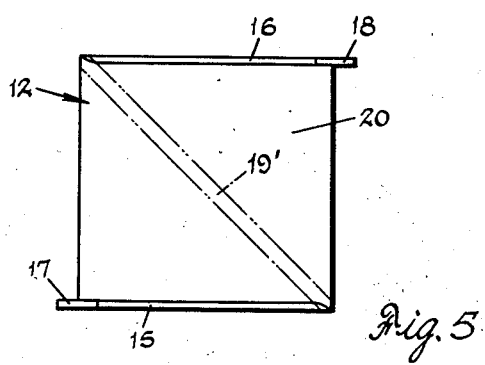
Fig. 5 is a developed view of the two opposite filmed surfaces and the filmed hypotenuse edge of the glass sheet of Figs. 1, 2 and 3.

Just exactly what this amounts to can be readily seen from the developed view of the filmed surfaces as shown in Fig. 5. As illustrated there, the triangular area at the lower left hand side is the filmed surface on the face of the glass sheet shown in Fig. 2, the triangular area at the upper right hand side is the filmed surface on the face of the glass sheet shown in Fig. 3, and the strip area 19' is the filmed surface of the hypothenuse edge 19 of the glass sheet. Consequently, the strip 19' connects the two triangular areas to form a continuous electrically conducting film which extends from the electrode 15 to the electrode 16; and in this combination the electrodes 15 and 16 are equidistant from each other throughout their lengths, as measured along the film 20.

Figure 4:
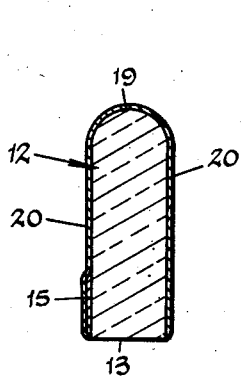
Fig. 4 is a section taken substantially along the line 4—4 in Fig. 2.

It will be noted from Fig. 4 that the hypothenuse edge 19 of the glass sheet 12 has been pencil polished. That is, it has been shaped to a half round by conventional edging procedures. I prefer this type of edge in practicing the invention because it is easier to film uniformly and to blend into the film on the contiguous surfaces. However, a seamed edge, that is, one in which the linear corners have been ground off will also be satisfactory; and even a beveled, straight or other sharp cornered edge can be used. In the latter case it may be necessary to control the filming of the edge more carefully to avoid any possibility of a break in the continuity of the film.

In producing the units of the invention, the electrodes 17 and 18 may be of any one of a number of different materials, and can be applied in any convenient manner. For example, electrodes of sprayed copper, sprayed copper alloys, baked-on gold, silver and platnium fluxes and combinations of these materials have all been used satisfactorily.

Similarly, as indicated above, the invention may be practiced in connection with various types of electrically conducting films. However, according to a preferred method, after the electrodes 17 and 18 are in place, the sheet 12 is heated to approximately the softening point of the glass and its opposite surfaces and the hypotenuse edge 19 are then sprayed with a solution of stannic tetrachloride to deposit a clear, transparent, electrically conducting layer of tin oxide 20 over these surfaces and in contact with the electrodes.

During the filming of the glass sheet 12 it is important that the two side edges 13 and 14 not be filmed, and this may be prevented in any well known manner, such as by masking, etc.

When the filmed glass sheet is to be employed in an airplane or automotive glazing, for example, it is preferred to incorporate it into an integral composite structure by assembling it together with additional sheets of glass and interposed non-brittle interlayers, and then bonding the several parts of the resulting glass-plastic sandwich together under heat and pressure to form a laminated safety glass unit.

Although the invention has proved especially valuable in producing the particular type of triangularly shaped lights now being specified for certain aircraft glazings, and has thus far been described principally in that connection, it will be understood that it can also be employed to advantage with glass sheets of other shapes. As a matter of fact, under certain conditions it may be desirable to use it even in connection with rectangularly shaped sheets.

Figure 6:
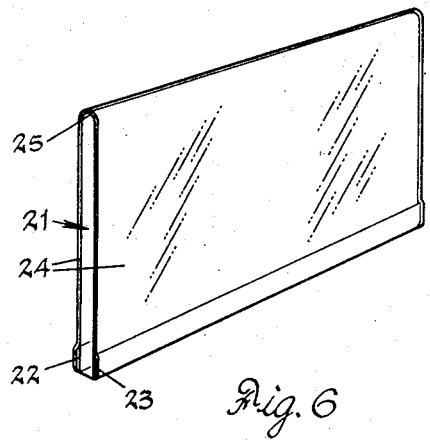
Fig. 6 is a perspective view of a rectangular light of glass which has been filmed and provided with electrodes in accordance with this invention.
Figure 7:
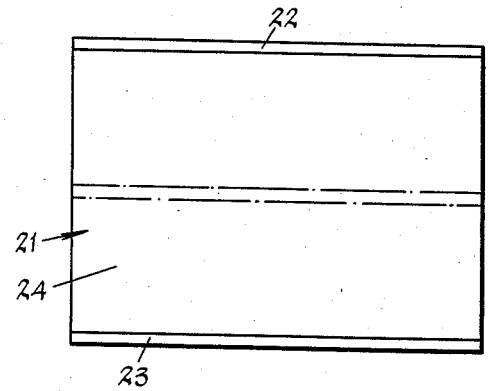
Fig. 7 is a developed view of the filmed surfaces and edge of the glass sheet of Fig. 6.

For example, it can be employed on rectangularly shaped sheets to provide additional heat, and in cases where the positioning of the electrodes in the conventional procedure creates structural or wiring difficulties in mounting the glazing unit. Such a use is illustrated in Figs. 6 and 7 wherein a rectangular sheet of glass 21 is provided with electrodes 22 and 23 along the lower marginal edges on its opposite faces. An electrically conducting film 24 is then applied to the opposite surfaces of the glass sheet and over the upper edge 25 to give the effect, as shown in Fig. 7, of a continuous film, of wider rectangular area than either glass surface, extending from the electrode 22 on one face to the electrode 23 on the other.

In connection with the increased heat provided by the resistance heating panels of this invention, it will be understood that my continuous film, which covers both surfaces of the glass sheet and extends from an electrode on one surface to an electrode on the opposite surface, will double the heat output from a given electrical input over that obtainable with the conventional single surface filming heretofore used, regardless of the shape of the sheet to which the film is applied.

Figure 8:
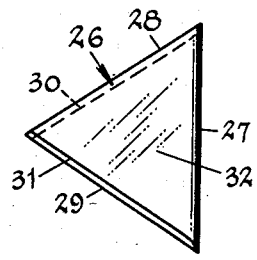
Fig. 8 is a view of a light of glass in the shape of an isosceles triangle which has been filmed and provided with electrodes in accordance with this invention.
Figure 9:
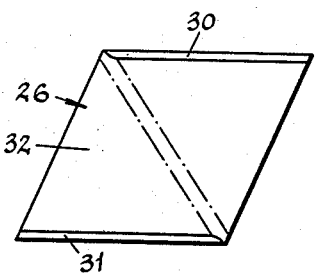
Fig. 9 is a developed view of the filmed surfaces and edge of the glass sheet of Fig. 8.

Figures 8 and 9 illustrate the invention as applied to a glass sheet 26 having the shape of an isosceles triangle whose base 27 is longer than its two equal sides 28 and 29. With this shape, electrodes 30 and 31 are preferably applied one along the margin at one side of the triangle and the other along the margin at the other side and on the opposite surface of the sheet. Both sides of the glass sheet and the base edge are then filmed to provide a continuous electrically conducting film 32 which, as shown in the developed view in Fig. 9, extends between the two electrodes.

With this particular shape of sheet it will be noted (Fig. 9) that the electrode 30 extends farther to the right and that the electrode 31 extends farther to the left so that the electrodes are not the same distance apart at these extended areas of the electrodes as they are at the other areas. However, the electrodes are equidistant from each other throughout the major portions of their length, as measured along the film 32, and the film will therefore be heated uniformly throughout its area, except in the part of the film at the extreme sides thereof, where it is outwardly of one or the other of the electrodes, when current is applied to the electrodes.

It is to be understood that the forms of the invention herewith shown and described are to be taken as illustrative embodiments only of the same, and that various changes in the shape, size and arrangement of parts may be resorted to without departing from the spirit of the invention or the scope of the subjoined claims.

I claim:

1. A resistance heating panel comprising a triangularly shaped sheet of glass, an elongated electrode on one surface of said sheet and substantially parallel with one edge of the sheet, an elongated electrode on the opposite surface of said sheet and substantially parallel with another edge thereof, and an electrically conducting film on said sheet extending from the electrode on one surface of the sheet to the electrode on the opposite surface and over the third edge of the sheet.

2. A resistance heating panel comprising a sheet of glass in the shape of a right angled triangle having two equal sides, an elongated electrode on one surface of said sheet and substantially parallel to one of said sides, an elongated electrode on the opposite surface of said sheet and substantially parallel to the other of said sides, and an electrically conducting film on said sheet extending from the electrode on one surface of the electrode on the opposite surface and over the hypotenuse edge of said sheet.

3. A resistance heating panel comprising a transparent sheet of glass in the shape of a right angled triangle having two equal sides, an elongated electrode on one surface of said sheet arranged along a margin of the sheet contiguous to one of said sides, an elongated electrode on the opposite surface of said sheet arranged along the margin of the sheet contiguous to another of said sides, and a clear transparent continuous electrically conducting film of tin oxide on the surfaces of said sheet and extending from the electrode on one surface to the electrode on the opposite surface and over the hypotenuse edge of said sheet.

4. A resistance heating panel comprising a sheet of glass having two adjoining side edges which form an angle other than a right angle but whose opposite surfaces and a contiguous edge when developed produce a substantially rectangular surface area, an elongated electrode along a margin on one surface of said sheet which margin becomes one side margin of said developed substantially rectangular surface area, an elongated electrode along the margin of the opposite surface which margin becomes the opposite side margin of said developed substantially rectangular surface area, and a continuous electrically conducting film on said surfaces and said edge of the sheet and extending from the electrode on one surface to the electrode on the opposite surface to provide a continuous filmed area between the two electrodes on said developed surface area.

5. A new article of manufacture comprising a triangularly shaped transparent sheet of glass having an edge from which the sharp corners have been removed, an elongated electrode on one surface of said sheet and having at least a portion thereof spaced from said edge, an elongated electrode on the opposite surface of said sheet and also having a portion at least thereof spaced from said edge, and an electrically conducting film on said sheet extending from the electrode on one surface to the electrode on the opposite surface and over said edge.

6. A new article of manufacture comprising a sheet of transparent glass having two adjoining side edges which form an angle other than a right angle but whose opposite surfaces and a contiguous edge when developed produce a continuous surface area, elongated electrodes on opposite surfaces of said sheet positioned in angular relation to one another but equidistant from one another throughout a substantial portion of their lengths as measured along said developed surface area, and a continuous transparent electrically conducting film on said surfaces and said edge of the sheet and extending from the electrode on one surface to the electrode on the opposite surface to provide a continuous filmed area between the two electrodes on said developed surface area.

7. A new article of manufacture comprising a sheet of glass in the shape of an isosceles triangle, an elongated electrode on one surface of said sheet and at an angle to an edge thereof, an elongated electrode on the opposite surface of said sheet and at an angle to said edge and to said first mentioned electrode, and a transparent electrically conducting film on said sheet extending from the electrode on one surface to the electrode on the opposite surface and over said edge.

References Cited in the file of this patent

UNITED STATES PATENTS

| Number | Name | Date |
|---|---|---|
| 2,021,661 | Kisfaludy | Nov. 19, 1935 |
| 2,119,680 | Long | June 7, 1938 |
| 2,429,420 | McMaster | Oct. 21, 1947 |
| 2,475,379 | Strong | July 5, 1949 |
| 2,487,695 | Cloud | Nov. 8, 1949 |
| 2,521,894 | Brown | Sept. 12, 1950 |
| 2,527,720 | Guyer | Oct. 31, 1950 |
| 2,557,983 | Linder | June 26, 1951 |
| 2,628,927 | Colbert et al. | Feb. 17, 1953 |